(12) United States Patent
Amjad et al.

(10) Patent No.: US 11,616,666 B2
(45) Date of Patent: Mar. 28, 2023

(54) NEURAL NETWORK AUGMENTATION FOR WIRELESS CHANNEL ESTIMATION AND TRACKING

(71) Applicant: QUALCOMM Incorporated, San Diego, CA (US)

(72) Inventors: Rana Ali Amjad, Amsterdam (NL); Kumar Pratik, Amsterdam (NL); Max Welling, Bussum (NL); Arash Behboodi, Amsterdam (NL); Joseph Binamira Soriaga, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 101 days.

(21) Appl. No.: 17/349,744

(22) Filed: Jun. 16, 2021

(65) Prior Publication Data

US 2021/0399924 A1    Dec. 23, 2021

Related U.S. Application Data

(60) Provisional application No. 63/041,637, filed on Jun. 19, 2020.

(51) Int. Cl.
*H04L 25/02* (2006.01)
*H04L 25/03* (2006.01)

(52) U.S. Cl.
CPC ........ *H04L 25/0254* (2013.01); *H04L 25/021* (2013.01); *H04L 25/0222* (2013.01); *H04L 25/03006* (2013.01); *H04L 2025/03656* (2013.01)

(58) Field of Classification Search
CPC ............... H04L 25/0254; H04L 25/021; H04L 25/0222; H04L 25/03006; H04L 2025/03656
See application file for complete search history.

(56) References Cited

U.S. PATENT DOCUMENTS

2018/0302213 A1    10/2018    Bose et al.

FOREIGN PATENT DOCUMENTS

WO    WO-2020226202 A1 * 11/2020    .......... H04J 13/0014
WO    WO-2021175444 A1 * 9/2021

OTHER PUBLICATIONS

Machine translation of WO-2020226202-A1 (Year: 2022).*
Satorras V.G., et al., "Combining Generative and Discriminative Models for Hybrid Inference", 33rd Conference on Neural Information Processing Systems (NeurIPS 2019), Vancouver, Canada, 2019, pp. 1-11.
International Search Report and Written Opinion—PCT/US2021/037938—ISA/EPO—Oct. 6, 2021.
(Continued)

*Primary Examiner* — Jean B Corrielus
(74) *Attorney, Agent, or Firm* — Seyfarth Shaw LLP

(57) ABSTRACT

A method performed by a communication device includes generating an initial channel estimate of a channel for a current time step with a Kalman filter based on a first signal received at the communication device. The method also includes inferring, with a neural network, a residual of the initial channel estimate of the current time step. The method further includes updating the initial channel estimate of the current time step based on the residual.

30 Claims, 10 Drawing Sheets

(56) References Cited

OTHER PUBLICATIONS

Qin, F., et al., "Link Quality Estimation in Industrial Temporal Fading Channel With Augmented Kalman Filter", IEEE Transactions on Industrial Informatics, IEEE Service Center, Newyork, NY, US, vol. 15, No. 4, Apr. 1, 2019 (Apr. 1, 2019), XP011718330, pp. 1936-1946, ISSN: 1551-3203, DOI: 10.1189/TII.2018.2859919 [retrieved on Apr. 3, 2019] Section IV.

* cited by examiner

NEURAL NETWORK AUGMENTATION FOR WIRELESS CHANNEL ESTIMATION AND TRACKING

CROSS-REFERENCE TO RELATED APPLICATION

The present application claims the benefit of U.S. Provisional Patent Application No. 63/041,637, filed on Jun. 19, 2020, and titled "NEURAL NETWORK AUGMENTATION FOR WIRELESS CHANNEL ESTIMATION AND TRACKING," the disclosure of which is expressly incorporated by reference in its entirety.

FIELD OF THE DISCLOSURE

Aspects of the present disclosure generally relate to wireless communications, and more particularly to techniques and apparatuses for channel estimation with neural network augmentation.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A UE may communicate with a BS via the downlink and uplink. The downlink (or forward link) refers to the communications link from the BS to the UE, and the uplink (or reverse link) refers to the communications link from the UE to the BS. As will be described in more detail, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

Artificial neural networks may comprise interconnected groups of artificial neurons (e.g., neuron models). The artificial neural network may be a computational device or represented as a method to be performed by a computational device. Convolutional neural networks, such as deep convolutional neural networks, are a type of feed-forward artificial neural network. Convolutional neural networks may include layers of neurons that may be configured in a tiled receptive field. It may be desirable to apply neural network processing to wireless communications to achieve greater efficiencies.

SUMMARY

In one aspect of the present disclosure, a method performed by a communication device includes generating an initial channel estimate of a channel for a current time step with a Kalman filter based on a first signal received at the communication device. The method further includes inferring, with a neural network, a residual of the initial channel estimate of the current time step. The method still further includes updating the initial channel estimate of the current time step based on the residual.

Another aspect of the present disclosure is directed to an apparatus at a communication device. The apparatus includes means for generating an initial channel estimate of a channel for a current time step with a Kalman filter based on a first signal received at the communication device. The apparatus further includes means for inferring, with a neural network, a residual of the initial channel estimate of the current time step. The apparatus still further includes means for updating the initial channel estimate of the current time step based on the residual.

In another aspect of the present disclosure, a non-transitory computer-readable medium with non-transitory program code recorded thereon at a communication device is disclosed. The program code is executed by a processor and includes program code to generate an initial channel estimate of a channel for a current time step with a Kalman filter based on a first signal received at the communication device. The program code further includes program code to infer, with a neural network, a residual of the initial channel estimate of the current time step. The program code still further includes program code to update the initial channel estimate of the current time step based on the residual.

Another aspect of the present disclosure is directed to an apparatus at a communication device. The apparatus includes a processor; a memory coupled with the processor; and instructions stored in the memory and operable, when executed by the processor, to cause the apparatus to generate an initial channel estimate of a channel for a current time step with a Kalman filter based on a first signal received at the communication device. Execution of the instructions also cause the apparatus to infer, with a neural network, a residual of the initial channel estimate of the current time step. Execution of the instructions also cause the apparatus to update the initial channel estimate of the current time step based on the residual. Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
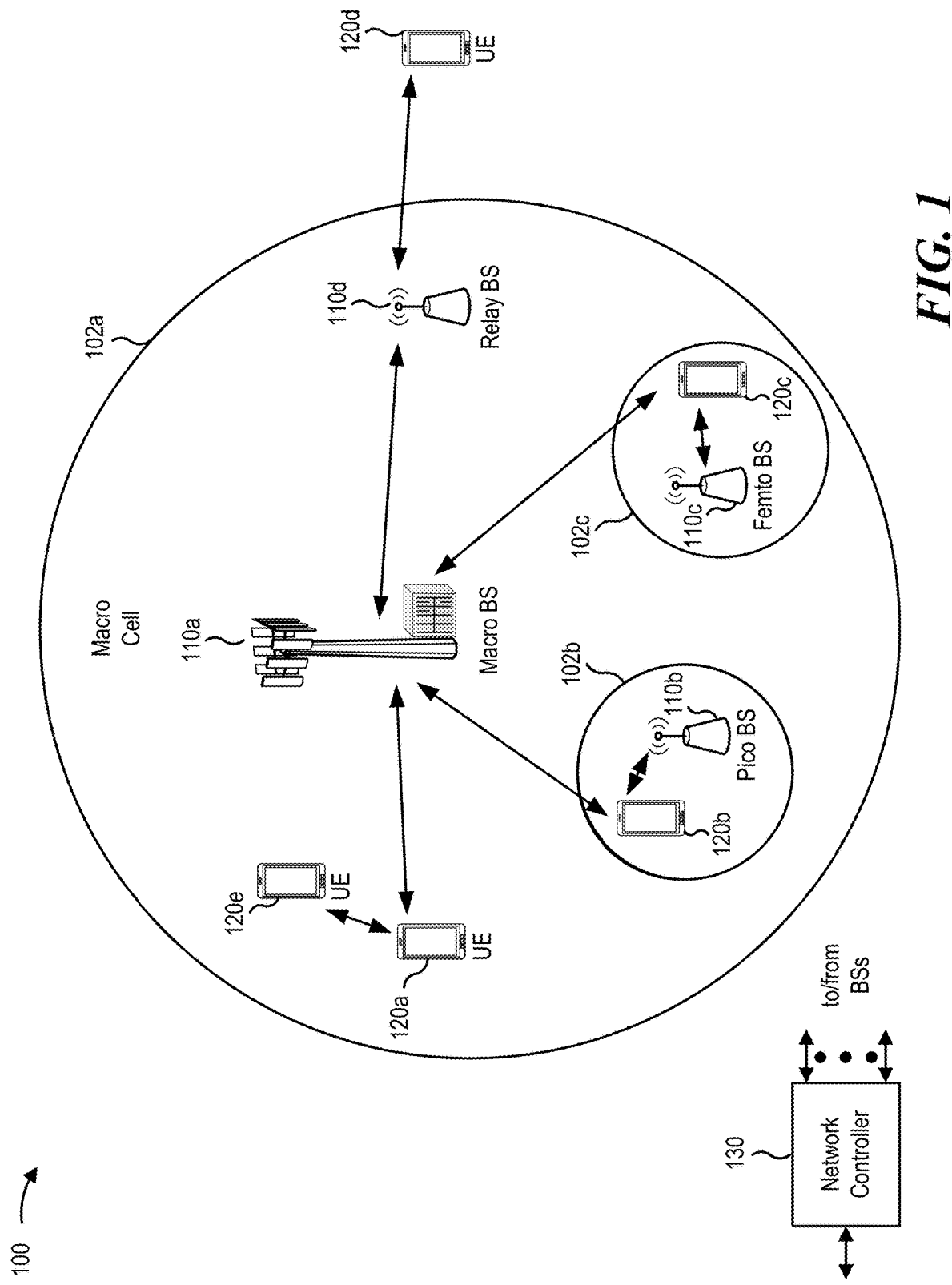
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described below using terminology commonly associated with 5G and later wireless technologies, aspects of the present disclosure can be applied in other generation-based communications systems, such as and including 3G and/or 4G technologies.

In a wireless communication system, a transmitter may process (e.g., encode and modulate) data to generate data symbols. In some examples, the transmitter multiplexes pilot symbols with the data symbols and transmits the multiplexed signal via a wireless channel. In some such examples, the wireless channel may distort the multiplexed signal with a channel response. Additionally, interference, such as channel noise, may reduce a quality of the signal. In such wireless communication systems, a receiver receives the multiplexed signal and processes the received signal to demodulate and decode the data. Specifically, in some examples, the receiver may estimate the channel based on the received pilot symbols. The receiver may obtain data symbol estimates based on the channel estimates. The data symbol estimates may be estimates of the data symbols sent by the transmitter. The receiver may process (e.g., demodulate and decode) the data symbol estimates to obtain the original data.

The receiver's ability to detect data, a quality of data symbol estimates, and a reliability of decoded data may be based on a quality of channel estimates. In some examples, the receiver's ability to detect the data, the quality of the data symbol estimates, and the reliability of the decoded data increase as the quality of the channel estimates increase. Thus, it may be desirable to derive high quality channel estimates. Channel estimation may be challenging if the wireless channel conditions can change over time. For example, the wireless channel may be relatively static at one moment and dynamic at another moment. As an example, the channel may change due to mobility of the transmitter and/or the receiver.

In some examples, a channel between a receiver and a transmitter may be estimated by a discrete stochastic process, where each time step corresponds to one orthogonal frequency division multiplexing (OFDM) symbol. The discrete stochastic process may generate a vector or tensor representing the channel estimate. In some cases, a Kalman filter (KF) tracks the channel estimation over time.

The Kalman filter assumes a hidden Markov model (HMM), where a true channel is a hidden process, and observed pilots are the observed process. The Kalman filter may track the channel based on the hidden Markov model. Additionally, the Kalman filter assumes linear transition dynamics and linear observation dynamics for the channel. Parameters for the Kalman filter may be derived based on the tracked channel data. In some cases, the parameters may be derived based on additional assumptions, such as Jakes' model for a Doppler spectrum.

The Kalman filter's assumptions may deviate from an actual evolution dynamics of the channel, thereby reducing channel estimation accuracy. Aspects of the present disclosure are directed to a neurally-augmented KF (NA-KF). The NA-KF may incorporate physics of the channel evolution encapsulated in the Kalman filter. Additionally, the NA-KF may correct a mismatch between actual channel dynamics and the Kalman filter's assumptions by adding a residual to the Kalman filter's estimates. Rather than tracking the channel, the residual may be tracked to improve transferability.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110$a$, BS 110$b$, BS 110$c$, and BS 110$d$) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110$a$ may be a macro BS for a macro cell 102$a$, a BS 110$b$ may be a pico BS for a pico cell 102$b$, and a BS 110$c$ may be a femto BS for a femto cell 102$c$. A BS may support one or multiple (e.g., three) cells. The terms "eNB," "base station," "NR BS," "gNB," "TRP," "AP," "node B," "5G NB," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110$d$ may communicate with macro BS 110$a$ and a UE 120$d$ in order to facilitate communications between the BS 110$a$ and UE 120$d$. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. The network controller 130 may communicate with the BSs via a backhaul. The BSs may also communicate with one another, e.g., directly or indirectly via a wireless or wireline backhaul.

UEs 120 (e.g., 120$a$, 120$b$, 120$c$) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

As indicated above, FIG. 1 is provided merely as an example. Other examples may differ from what is described with regard to FIG. 1.

Figure 2:
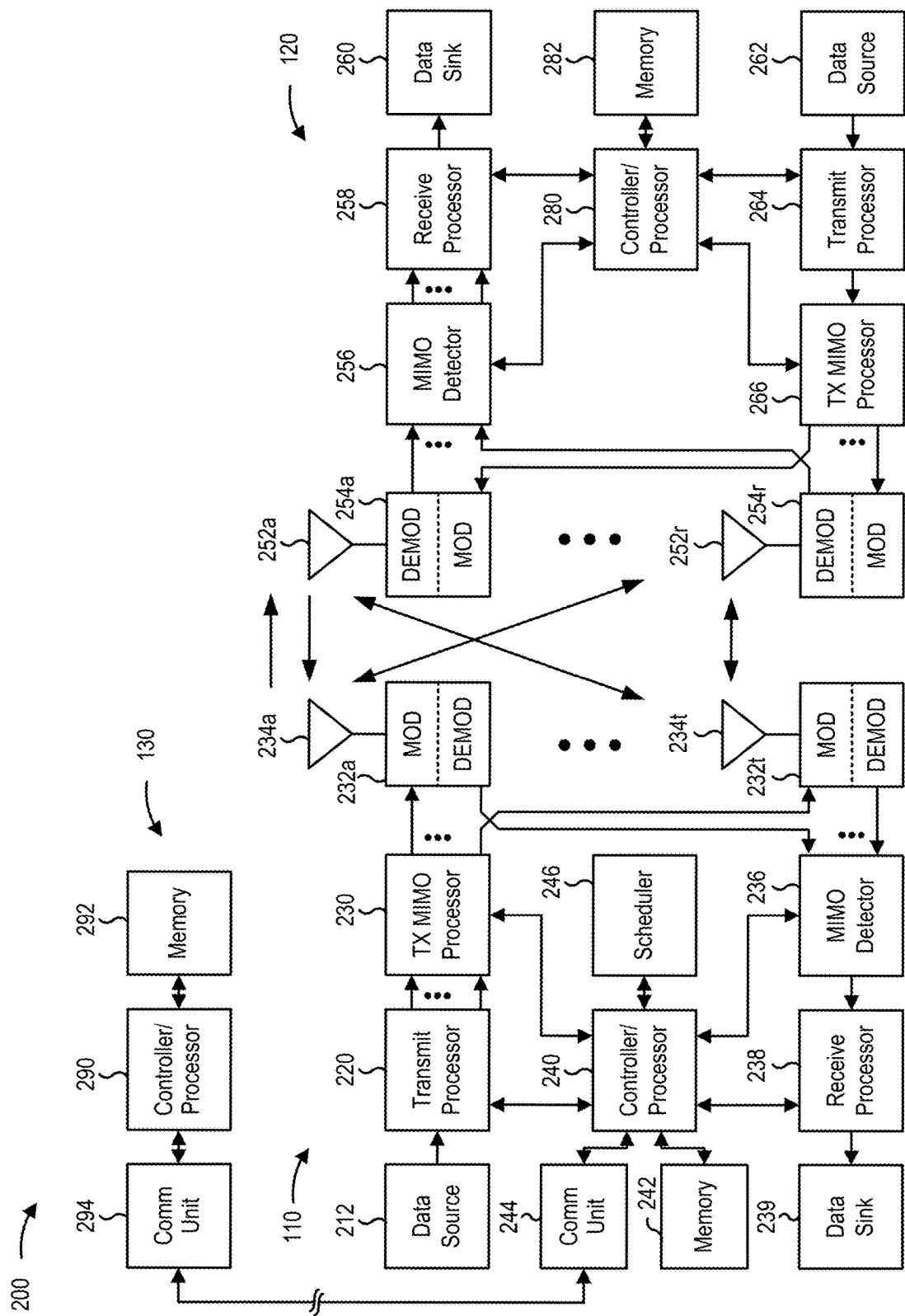
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the network controller 130 via the communications unit 244. The network controller 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with machine learning for non-linearities, as described in more detail elsewhere. For example, the controller/processor 240 of the base station 110, the controller/processor 280 of the UE 120, and/or any other component(s) of FIG. 2 may perform or direct operations of, for example, the processes of FIGS. 6-8 and/or other processes as described. Memories 242 and 282 may store data and program codes for the base station 110 and UE 120, respectively. A scheduler 246 may schedule UEs for data transmission on the downlink and/or uplink.

In some aspects, the UE 120 may include means for generating a channel estimate for a current time step with a Kalman filter; inferring a residual based on the channel estimate of the current time step; and updating the channel estimate of the current time step based on the residual. Such means may include one or more components of the UE 120 or base station 110 described in connection with FIG. 2.

As indicated above, FIG. 2 is provided merely as an example. Other examples may differ from what is described with regard to FIG. 2.

In some cases, different types of devices supporting different types of applications and/or services may coexist in a cell. Examples of different types of devices include UE handsets, customer premises equipment (CPEs), vehicles, Internet of Things (IoT) devices, and/or the like. Examples of different types of applications include ultra-reliable low-latency communications (URLLC) applications, massive machine-type communications (mMTC) applications, enhanced mobile broadband (eMBB) applications, vehicle-to-anything (V2X) applications, and/or the like. Furthermore, in some cases, a single device may support different applications or services simultaneously.

Figure 3:
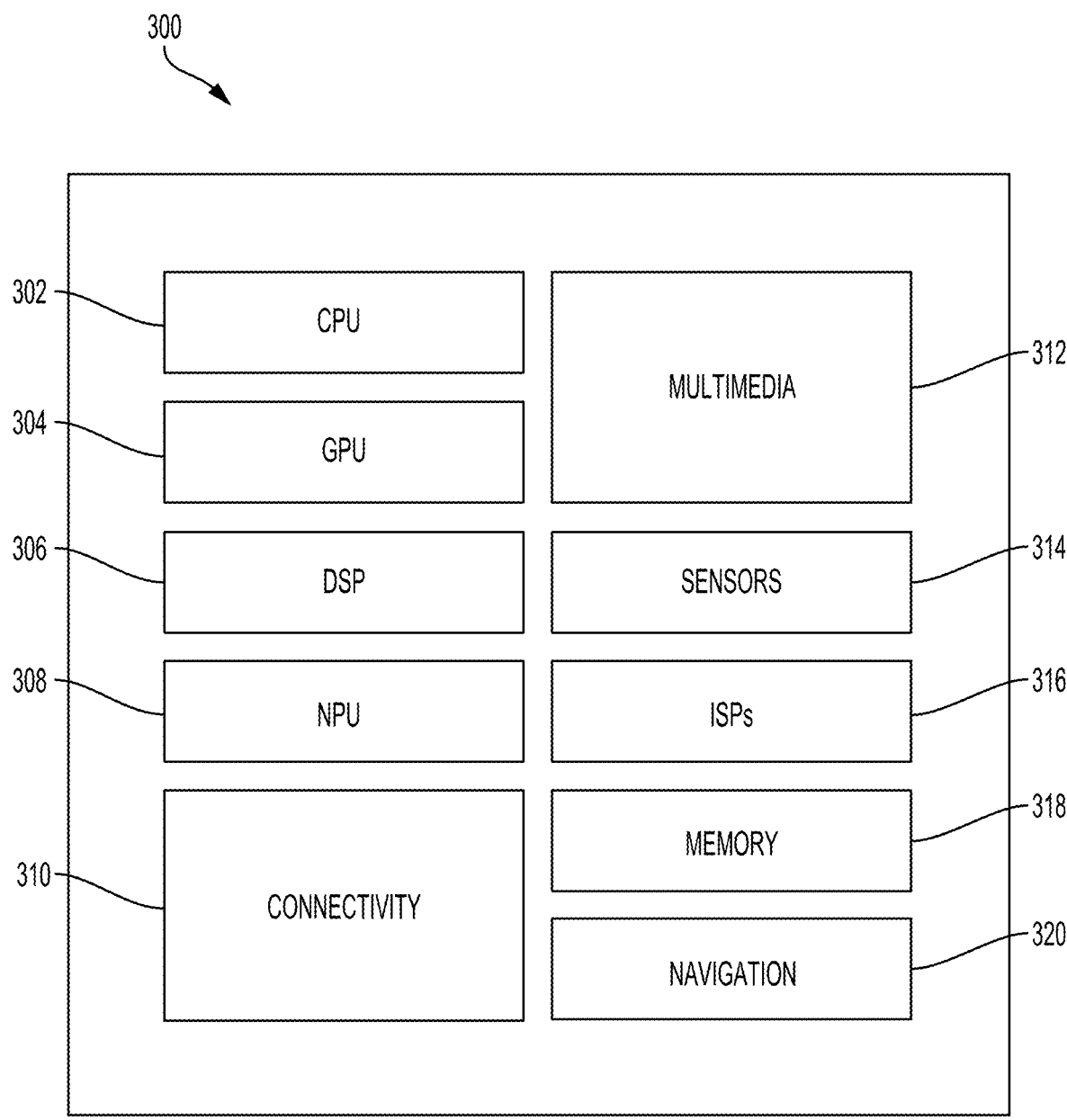
FIG. 3 illustrates an example implementation of designing a neural network using a system-on-a-chip (SOC), including a general-purpose processor, in accordance with certain aspects of the present disclosure.

FIG. 3 illustrates an example implementation of a system-on-a-chip (SOC) 300, which may include a central processing unit (CPU) 302 or a multi-core CPU configured for augmenting Kalman filter estimates, in accordance with certain aspects of the present disclosure. The SOC 300 may be included in the base station 110 or UE 120. Variables (e.g., neural signals and synaptic weights), system parameters associated with a computational device (e.g., neural network with weights), delays, frequency bin information, and task information may be stored in a memory block associated with a neural processing unit (NPU) 308, in a memory block associated with a CPU 302, in a memory block associated with a graphics processing unit (GPU) 304, in a memory block associated with a digital signal processor (DSP) 306, in a memory block 318, or may be distributed across multiple blocks. Instructions executed at the CPU 302 may be loaded from a program memory associated with the CPU 302 or may be loaded from a memory block 318.

The SOC 300 may also include additional processing blocks tailored to specific functions, such as a GPU 304, a DSP 306, a connectivity block 310, which may include fifth generation (5G) connectivity, fourth generation long term evolution (4G LTE) connectivity, Wi-Fi connectivity, USB connectivity, Bluetooth connectivity, and the like, and a multimedia processor 312 that may, for example, detect and recognize gestures. In one implementation, the NPU is implemented in the CPU, DSP, and/or GPU. The SOC 300 may also include a sensor processor 314, image signal processors (ISPs) 316, and/or navigation module 320, which may include a global positioning system.

The SOC 300 may be based on an ARM instruction set. In an aspect of the present disclosure, the instructions loaded into the general-purpose processor 302 may comprise code to generate a channel estimate for a current time step with a Kalman filter; to infer a residual based on the channel estimate of the current time step; and to update the channel estimate of the current time step based on the residual.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 4A:
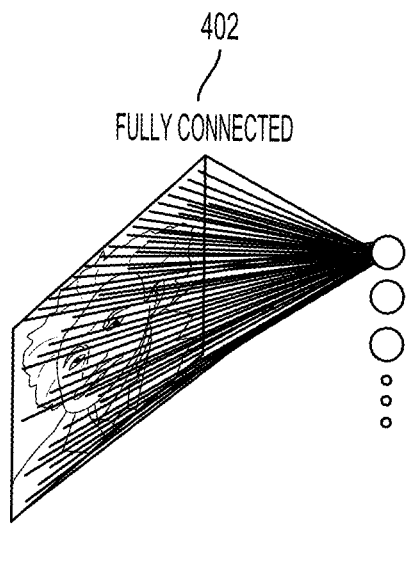
FIGS. 4A, 4B, and 4C are diagrams illustrating a neural network, in accordance with aspects of the present disclosure.
Figure 4B:
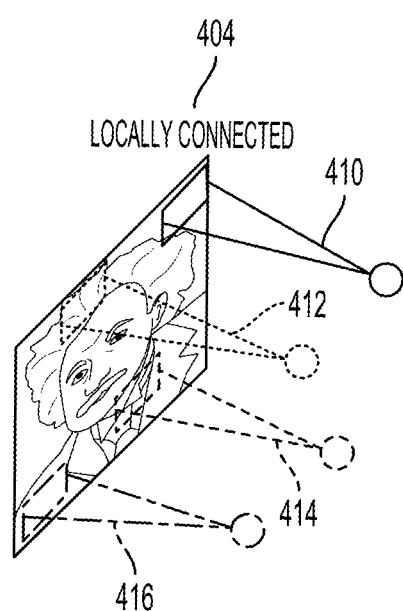

The connections between layers of a neural network may be fully connected or locally connected. FIG. 4A illustrates an example of a fully connected neural network 402. In a fully connected neural network 402, a neuron in a first layer may communicate its output to every neuron in a second layer, so that each neuron in the second layer will receive input from every neuron in the first layer. FIG. 4B illustrates an example of a locally connected neural network 404. In a locally connected neural network 404, a neuron in a first layer may be connected to a limited number of neurons in the second layer. More generally, a locally connected layer of the locally connected neural network 404 may be configured so that each neuron in a layer will have the same or a similar connectivity pattern, but with connections strengths that may have different values (e.g., 410, 412, 414, and 416). The locally connected connectivity pattern may give rise to spatially distinct receptive fields in a higher layer, because the higher layer neurons in a given region may receive inputs that are tuned through training to the properties of a restricted portion of the total input to the network.

Figure 4C:
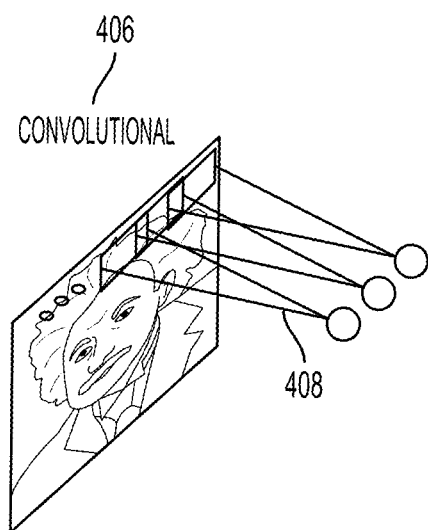

One example of a locally connected neural network is a convolutional neural network. FIG. 4C illustrates an example of a convolutional neural network 406. The convolutional neural network 406 may be configured such that the connection strengths associated with the inputs for each neuron in the second layer are shared (e.g., 408). Convolutional neural networks may be well suited to problems in which the spatial location of inputs is meaningful.

Figure 4D:
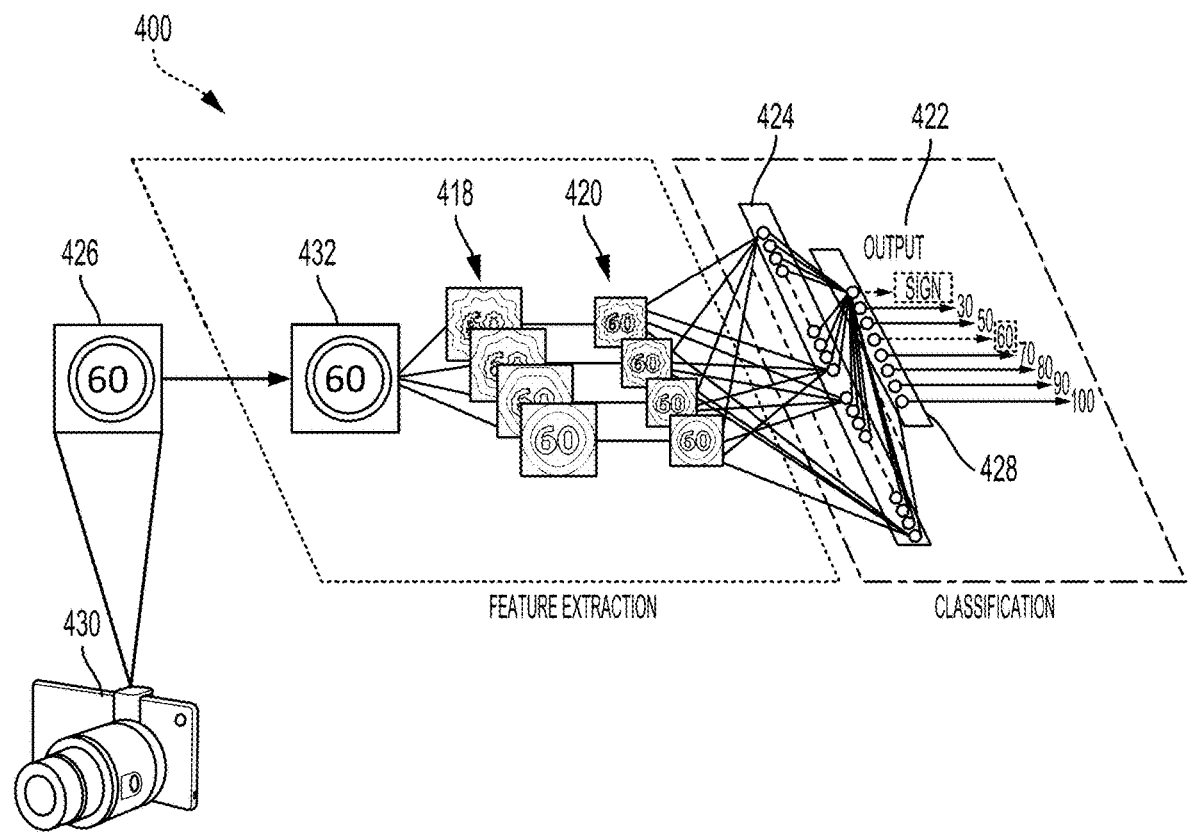
FIG. 4D is a diagram illustrating an exemplary deep convolutional network (DCN), in accordance with aspects of the present disclosure.

One type of convolutional neural network is a deep convolutional network (DCN). FIG. 4D illustrates a detailed example of a DCN 400 designed to recognize visual features from an image 426 input from an image capturing device 430, such as a car-mounted camera. The DCN 400 of the current example may be trained to identify traffic signs and a number provided on the traffic sign. Of course, the DCN 400 may be trained for other tasks, such as identifying lane markings or identifying traffic lights.

The DCN 400 may be trained with supervised learning. During training, the DCN 400 may be presented with an image, such as the image 426 of a speed limit sign, and a forward pass may then be computed to produce an output 422. The DCN 400 may include a feature extraction section and a classification section. Upon receiving the image 426, a convolutional layer 432 may apply convolutional kernels (not shown) to the image 426 to generate a first set of feature maps 418. As an example, the convolutional kernel for the convolutional layer 432 may be a 5×5 kernel that generates 28×28 feature maps. In the present example, because four different feature maps are generated in the first set of feature maps 418, four different convolutional kernels were applied to the image 426 at the convolutional layer 432. The convolutional kernels may also be referred to as filters or convolutional filters.

The first set of feature maps 418 may be subsampled by a max pooling layer (not shown) to generate a second set of feature maps 420. The max pooling layer reduces the size of the first set of feature maps 418. That is, a size of the second set of feature maps 420, such as 14×14, is less than the size of the first set of feature maps 418, such as 28×28. The reduced size provides similar information to a subsequent layer while reducing memory consumption. The second set of feature maps 420 may be further convolved via one or more subsequent convolutional layers (not shown) to generate one or more subsequent sets of feature maps (not shown).

In the example of FIG. 4D, the second set of feature maps 420 is convolved to generate a first feature vector 424. Furthermore, the first feature vector 424 is further convolved to generate a second feature vector 428. Each feature of the second feature vector 428 may include a number that corresponds to a possible feature of the image 426, such as "sign," "60," and "100." A softmax function (not shown) may convert the numbers in the second feature vector 428 to a probability. As such, an output 422 of the DCN 400 is a probability of the image 426 including one or more features.

In the present example, the probabilities in the output 422 for "sign" and "60" are higher than the probabilities of the others of the output 422, such as "30," "40," "50," "70," "80," "90," and "100". Before training, the output 422 produced by the DCN 400 is likely to be incorrect. Thus, an error may be calculated between the output 422 and a target output. The target output is the ground truth of the image 426 (e.g., "sign" and "60"). The weights of the DCN 400 may then be adjusted so the output 422 of the DCN 400 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images (e.g., the speed limit sign of the image 426) and a forward pass through the network may yield an output 422 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 5:
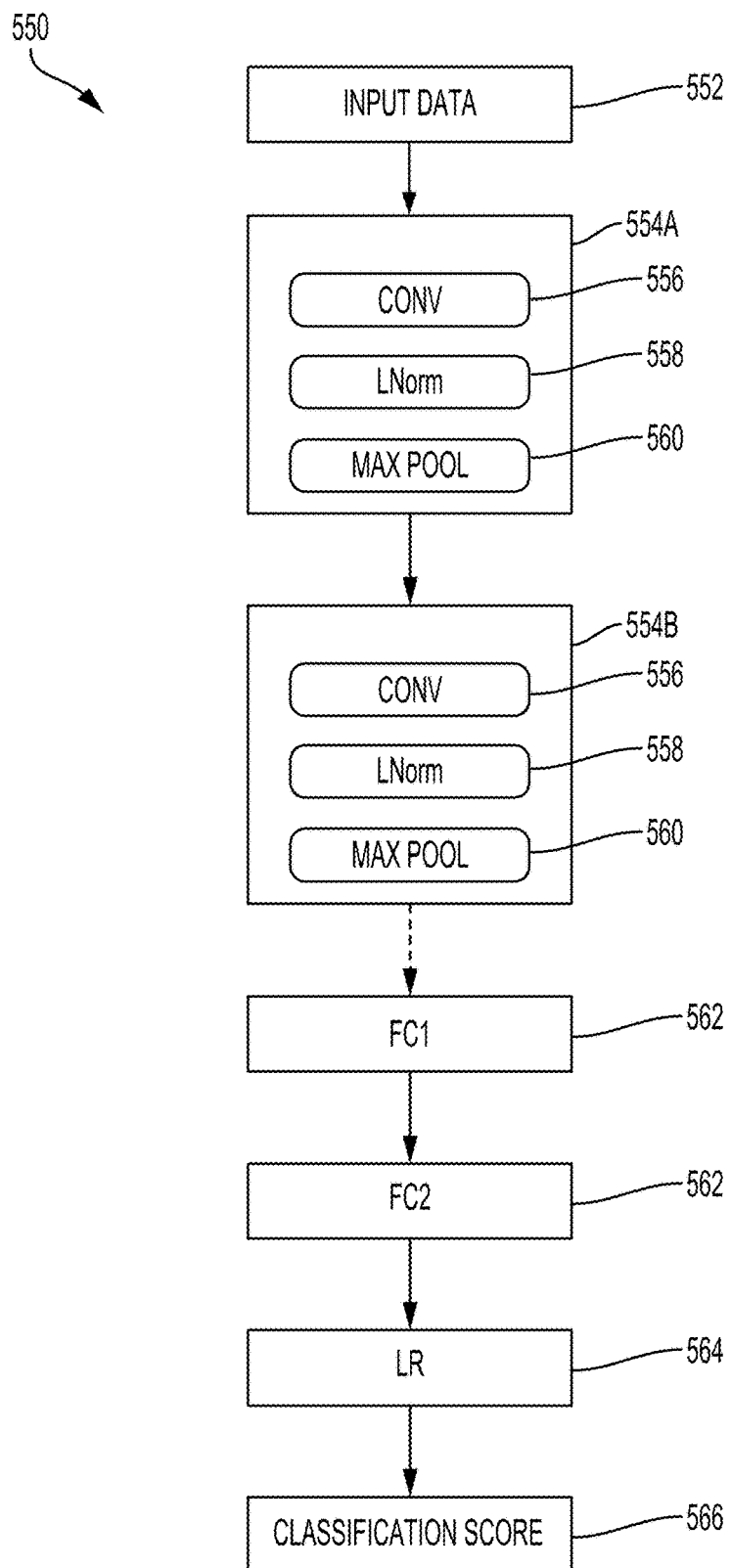
FIG. 5 is a block diagram illustrating an exemplary deep convolutional network (DCN), in accordance with aspects of the present disclosure.

FIG. 5 is a block diagram illustrating a deep convolutional network 550, in accordance with aspects of the present disclosure. The deep convolutional network 550 may include multiple different types of layers based on connectivity and weight sharing. As shown in FIG. 5, the deep convolutional network 550 includes the convolution blocks 554A, 554B. Each of the convolution blocks 554A, 554B may be configured with a convolution layer (CONV) 356, a normalization layer (LNorm) 558, and a max pooling layer (MAX POOL) 560.

The convolution layers 556 may include one or more convolutional filters, which may be applied to the input data to generate a feature map. Although only two of the convolution blocks 554A, 554B are shown, the present disclosure is not so limiting, and instead, any number of the convolution blocks 554A, 554B may be included in the deep convolutional network 550 according to design preference. The normalization layer 558 may normalize the output of the convolution filters. For example, the normalization layer 558 may provide whitening or lateral inhibition. The max pooling layer 560 may provide down sampling aggregation over space for local invariance and dimensionality reduction.

The parallel filter banks, for example, of a deep convolutional network may be loaded on a CPU 302 or GPU 304 of an SOC 300 to achieve high performance and low power consumption. In alternative embodiments, the parallel filter banks may be loaded on the DSP 306 or an ISP 316 of an SOC 300. In addition, the deep convolutional network 550 may access other processing blocks that may be present on the SOC 300, such as sensor processor 314 and navigation module 320, dedicated, respectively, to sensors and navigation.

The deep convolutional network 550 may also include one or more fully connected layers 562 (FC1 and FC2). The deep convolutional network 550 may further include a logistic regression (LR) layer 564. Between each layer 556, 558, 560, 562, 564 of the deep convolutional network 550 are weights (not shown) that are to be updated. The output of each of the layers (e.g., 556, 558, 560, 562, 564) may serve as an input of a succeeding one of the layers (e.g., 556, 558, 560, 562, 564) in the deep convolutional network 550 to learn hierarchical feature representations from input data 552 (e.g., images, audio, video, sensor data and/or other input data) supplied at the first of the convolution blocks 554A. The output of the deep convolutional network 550 is a classification score 566 for the input data 552. The classification score 566 may be a set of probabilities, where each probability is the probability of the input data, including a feature from a set of features.

Figure 6:
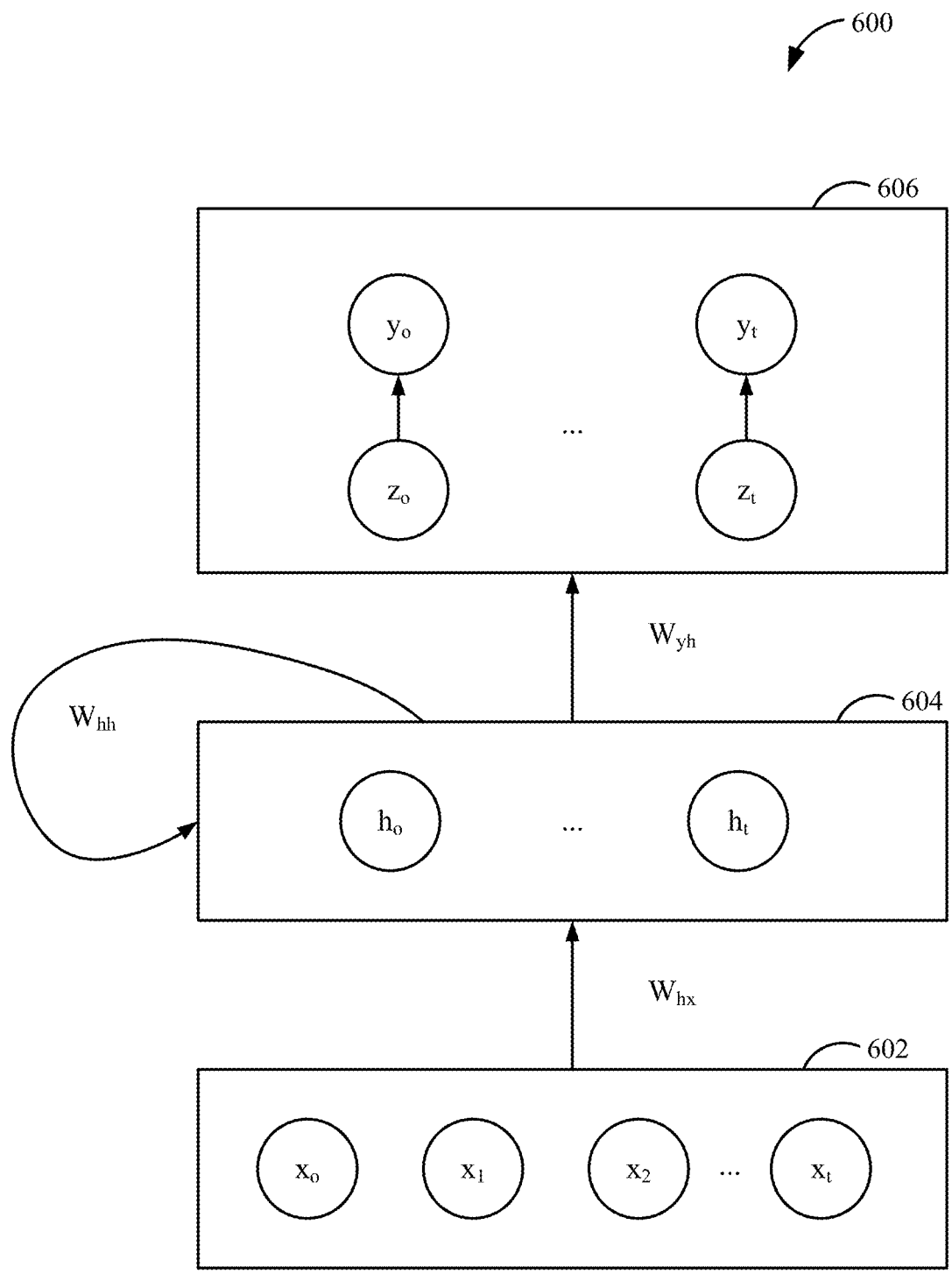
FIG. 6 is a schematic diagram illustrating a recurrent neural network (RNN) in accordance with aspects of the present disclosure.

FIG. 6 is a schematic diagram illustrating a recurrent neural network (RNN) 600, in accordance with aspects of the present disclosure. The recurrent neural network 600 includes an input layer 602, a hidden layer 604 with recurrent connections, and an output layer 606. Given an input sequence X with multiple input vectors $x_T$ (e.g., $X=\{x_0, x_1, x_2 \ldots x_t\}$), the recurrent neural network 600 will predict a classification label $y_t$ for each output vector $z_t$ of an output sequence Z (e.g., $Z=\{z_0 \ldots z_T\}$). As shown in FIG. 6, a hidden layer 604 with M units (e.g., $h_o \ldots h_t$) is specified between the input layer 602 and the output layer 606. The M units of the hidden layer 604 store information on the previous values (t'<t) of the input sequence X. The M units may be computational nodes (e.g., neurons). In one configuration, the recurrent neural network 600 receives an input $x_T$ and generates a classification label $y_t$ of the output $z_T$ by iterating the equations:

$$s_t = W_{hx} x_t W_{hh} h_{t-1} + b_h \quad (1)$$

$$h_t = f(s_t) \quad (2)$$

$$o_t = W_{yh} h_t + b_y \quad (3)$$

$$y_t = g(o_t) \quad (4)$$

where $W_{hx}$, $W_{hh}$, and $W_{yh}$ are the weight matrices, $b_h$ and $b_y$ are the biases, $s_t$ and $o_t$ are inputs to the hidden layer 604 and the output layer 606, respectively, and $f$ and $g$ are nonlinear functions. The function $f$ may comprise a rectifier linear unit (RELU) and, in some aspects, the function g may comprise a linear function or a softmax function. In addition, the hidden layer nodes are initialized to a fixed bias bi such that at t=0 $h_o$=bi. In some aspects, bi may be set to zero (e.g., bi=0). The objective function, $C(\theta)$, for a recurrent neural network with a single training pair (x,y) is defined as $C(\theta)=\Sigma_t L_t(z, y(\theta))$, where $\theta$ represents the set of parameters (weights and biases) in the recurrent neural network.

As indicated above, FIGS. 3-6 are provided as examples. Other examples may differ from what is described with respect to FIGS. 3-6.

As described, a channel between a receiver and a transmitter may be estimated by a discrete stochastic process, where each time step corresponds to one orthogonal frequency division multiplexing (OFDM) symbol. The discrete stochastic process may generate a vector or tensor representing the channel estimate. In some implementations, the channel may be a wireless communication channel. In some examples, the wireless communication channel may be tracked by a Kalman filter (KF). In some such examples, the Kalman filter may track an estimation of the wireless communication channel over time.

Additionally, as described, the Kalman filter assumes a hidden Markov model (HMM), where a true channel corresponds to a hidden process and observed pilots correspond to an observed process. The Kalman filter may track the channel based on the hidden Markov model. Parameters for the Kalman filter may be derived or based on observed data, such as the observed pilots. In some cases, the parameters may be analytically derived based on additional assumptions, such as Jakes' model for a Doppler spectrum.

In some examples, the Kalman filter may assume linear transition dynamics as well as a linear observation process for the channel. In some such examples, the Kalman filter's assumptions may deviate from actual evolution dynamics of the channel, thereby reducing an accuracy of channel estimates. For example, the accuracy of the channel estimates may be reduced under certain channel conditions, such as a high Doppler shift or a combination of different Doppler shifts. As another example, the accuracy of the channel estimates may be reduced when a single tracking function is used for various communication scenarios. Therefore, it may be desirable to improve an accuracy of channel estimates derived from a Kalman filter.

Aspects of the present disclosure are directed to augmenting a Kalman filter with an artificial neural network, such as a recurrent neural network, to improve channel estimates. For ease of explanation, the augmented Kalman filter may be referred to as a neurally-augmented Kalman filter (NA-KF). Additionally, the neural network may be referred to as a neural augmentation unit. In some examples, the NA-KF may incorporate coarse channel dynamics encapsulated in an output of the Kalman filter. A Doppler value is an example of a coarse channel dynamic. In some examples, the NA-KF may provide a Doppler value as an additional output. Additionally, the NA-KF may correct a mismatch between actual channel dynamics and the Kalman filter assumptions by adding a residual to the Kalman filter's estimates. In some examples, rather than tracking the channel, a residual error may be tracked to improve transferability. In some implementations, a pattern learning function of the neural augmentation unit may be combined with channel analytics generated by a Kalman filter to improve channel estimates.

As described, the Kalman filter may be augmented with a neural augmentation unit (e.g., recurrent neural network). In some implementations, at each time step, the neural augmentation unit may generate residuals based on an output of the Kalman filter. In some examples, at each time step, the Kalman filter may output mean and covariance estimates based on mean and covariance estimates of a previous time step. The residuals may be combined with the Kalman filter to generate a residual corrected estimate, such as a residual corrected mean and a residual corrected covariance. In some examples, the output of the Kalman filter may also be based on a channel observation. In some such examples, the channel observation may be obtained from a received pilot symbol (e.g., reference signal). In some examples, in the absence of a pilot symbol, the neural augmentation unit may generate synthetic pilot observation in the absence of an actual pilot observation derived from a received pilot symbol.

According to aspects of the present disclosure, the neural augmentation unit does not modify a direct input or a direct output of the Kalman filter. In some examples, the neural augmentation unit may be disabled to provide a standalone Kalman filter. In such examples, the standalone Kalman filter may be backward compatible with conventional communication systems, such as a conventional wireless communication system.

In some examples, the Kalman filter may assume the following hidden Markov models (HMM):

$$h_t = Ah_{t-1} + w_t$$

$$o_t = Bh_t + v_t, \quad (5)$$

where the parameter $h_t$ represents a vector (e.g., a flattened vector) of a state of a true channel at a discrete time step t, the parameter $w_t$ represents process noise, and the parameter $v_t$ represents observation noise, and the parameters A and B represent coefficients. In some cases, such as a multiple-input multiple-output channel, the parameter $h_t$ may represent a tensor of the state of the channel at the discrete time step t. Additionally, the parameter $o_t$ represents a noisy observation of a portion of the channel $h_t$ determined from a pilot symbol. The parameter $o_t$ may be referred to as a pilot observation.

As described, a receiver may estimate a channel based on a pilot symbol received on the channel. The channel estimate may be used for maximal ratio combining, equalization, matched filtering, data detection, or demodulation, for example. In some examples, a transmitter, such as the base station 110 as described with reference to FIG. 1, may transmit pilot symbols at an interval, such as a periodic interval. In some other examples, the pilot symbols may also be asynchronously transmitted. In some cases, the transmit waveforms may be reconstructed based on decoded data or control payloads. The transmit waveforms may be used as pilots for channel estimation. The Kalman filter assumes the channel state $h_t$ at a current state is dependent on a channel state at one or more previous channel states, such as channel states $h_{t-1}$ to $h_{t-N}$. In equation 5, a current channel state $h_t$ may be based on a linear transformation of a previous channel state $h_{t-1}$ and process noise $w_t$. Additionally, a synthetic estimate of the pilot observation $o_t$ may be obtained based on a linear transformation of a current channel state $h_t$ and observed noise $v_t$.

The parameters of the Kalman filter may include matrices A and B, the process noise $w_t$, and the observation noise $v_t$. The parameters may be learned or derived from a model, such as Jakes' model. The Kalman filter may generate a mean $\tilde{\mu}_t$ and covariance $\tilde{\Sigma}_t$ estimates of the channel state $h_t$ based on the observation $o_t$ (when available) and mean $\tilde{\mu}_{t-1}$ and covariance $\tilde{\Sigma}_{t-1}$ estimates for a previous channel state $h_{t-1}$. The estimation process may be a two-step process, where each step may be linear.

In some examples, the current channel estimate, such as the mean $\tilde{\mu}_t$ and covariance $\tilde{\Sigma}_t$ estimates, of a current channel state $h_t$ may be based on mean $\tilde{\mu}_{t-1}$ to $\tilde{\mu}_{t-N}$ and covariance $\tilde{\Sigma}_{t-1}$ and $\tilde{\Sigma}_{t-N}$ estimates from previous channel states. For example, a vector of the previous channel state $h_{t-1}$ may be replaced with a concatenated vector of multiple previous channel states $h_{t-1}$ to $h_{t-N}$. In one configuration, a higher order auto-regressive channel model may be tracked by replacing the parameter $h_t$ in equation 5 with a parameter $s_t$ representing a concatenation of channel vectors for multiple previous time steps. In some examples, the channel estimates may be performed in a time domain, therefore, further restrictions may be introduced to include further prior information, such as independent channel taps. In one example, the matrix A may be restricted to a diagonal matrix.

Figure 7:
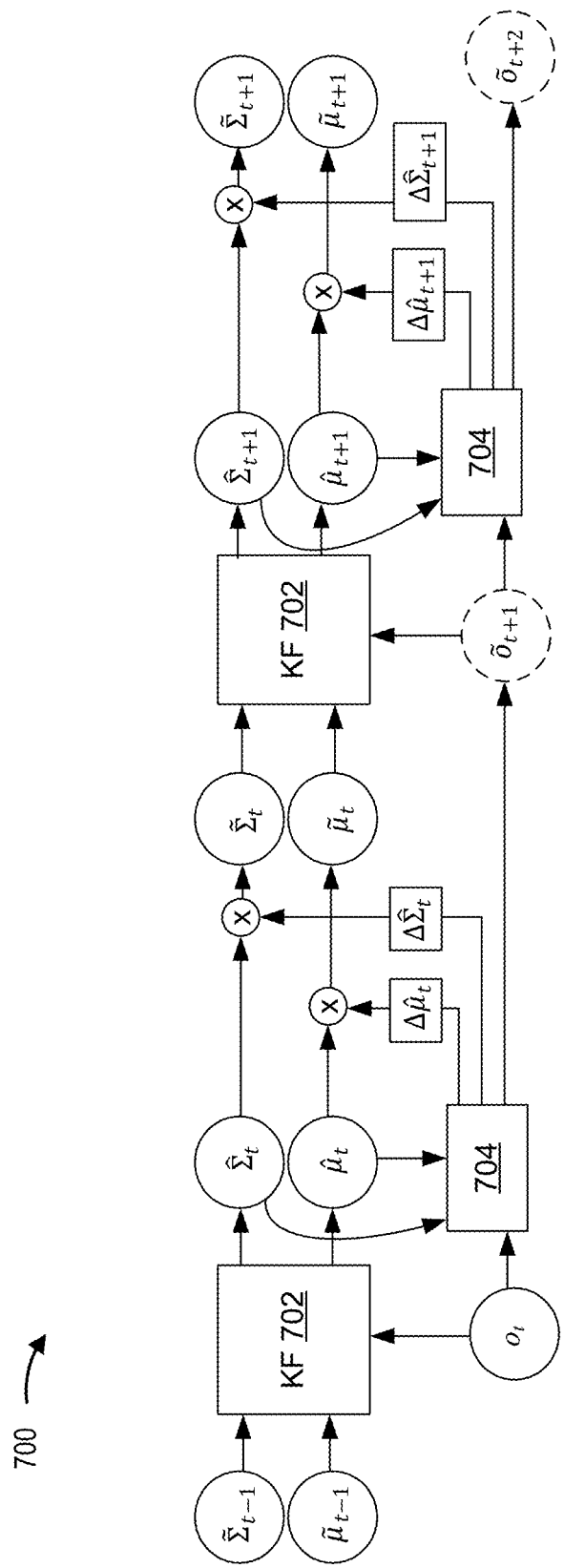
FIG. 7 is a block diagram illustrating an example of augmenting an output of a Kalman filter (KF) with a neural augmentation unit at multiple time-steps, in accordance with aspects of the present disclosure.

FIG. 7 is a block diagram illustrating an example 700 of augmenting an output of a Kalman filter (KF) 702 with a neural augmentation unit 704 at multiple time-steps, in accordance with aspects of the present disclosure. In the example of FIG. 7, the Kalman filter 702 and the neural augmentation unit 704 may be components of a UE, such as the UE 120 described with reference to FIGS. 1 and 2. In some such examples, the channel estimates may be used by one or more of the controller/processor 280, transmit processor 264, and/or demodulator 254a-254r as described with reference to FIG. 2. In some other examples, the Kalman filter 702 and the neural augmentation unit 704 may be components of a base station, such as the base station 110 described reference to FIGS. 1 and 2. In some such examples, the channel estimates may be used by one or more of the controller/processor 240, transmit processor 220, and/or demodulator 232a-232t as described with reference to FIG. 2. The Kalman filter 702 and the neural augmentation unit 704 of FIG. 7 may be an example of a neurally-augmented Kalman filter (NA-KF).

As shown in FIG. 7, at a current time step t, the Kalman filter 702 receives a mean $\hat{\mu}_{t-1}$ and a covariance $\hat{\Sigma}_{t-1}$ of a previous channel estimate, and an observation $o_t$ of current time step t. As described, an observation $o_t$ at the time step t may be generated based on a pilot symbol received at the time step t. In some examples, the observation $o_t$ may be referred to as an instantaneous channel estimation. In the example of FIG. 7, based on the inputs, the Kalman filter 702 generates a mean $\hat{\mu}_t$ and a covariance $\hat{\Sigma}_t$ for the current time step t. The mean $\hat{\mu}_t$ and the covariance $\hat{\Sigma}_t$ may represent an initial channel estimate for the current time step t.

At each time step, the mean $\hat{\mu}_t$ and the covariance $\hat{\Sigma}_t$ from the Kalman filter 702 may be input to the neural augmentation unit 704. As shown in FIG. 7, the neural augmentation unit 704 may also receive the observation $o_t$ from the current time step t. The neural augmentation unit 704 may be a recurrent network, such as a long short term memory (LSTM) network, a gated recurrent unit (GRU), or another type of recurrent neural network. The neural augmentation unit 704 may generate a residual of the mean $\Delta\hat{\mu}_t$ and a residual of the covariance $\Delta\hat{\Sigma}_t$ for the current time step t. As shown in FIG. 7, the residuals of the mean $\Delta\hat{\mu}_t$ and the covariance $\Delta\hat{\Sigma}_t$ may update the mean $\hat{\mu}_t$ and the covariance $\hat{\Sigma}_t$ of the Kalman filter 702 to obtain an actual estimate of the mean $\tilde{\mu}_t$ and covariance $\tilde{\Sigma}_t$ of the channel state at the current time step. In some examples, the residual of the mean $\Delta\hat{\mu}_t$ may be added to the mean $\hat{\mu}_t$ of the Kalman filter to obtain an actual estimate of the mean $\tilde{\mu}_t$. Additionally, the residual of the covariance $\Delta\hat{\Sigma}_t$ may be added to the covariance $\hat{\Sigma}_t$ of the Kalman filter 702 to obtain the actual estimate of the covariance $\tilde{\Sigma}_t$.

In a conventional system, the mean $\hat{\mu}_t$ and covariance $\hat{\Sigma}_t$ generated by the Kalman filter 702 for one time step may be input to the Kalman filter 702 to determine a channel estimate for a subsequent time step. In contrast, aspects of the present disclosure augment the mean $\hat{\mu}_t$ and covariance $\hat{\Sigma}_t$ of the current time step with the residual of the mean $\Delta\hat{\mu}_t$ and a residual of the covariance $\Delta\hat{\Sigma}_t$ to correct the estimates of the Kalman filter 702. That is, the output of the Kalman filter 702 is interleaved with an output of the neural augmentation unit 704. The corrected estimates may be used for a subsequent estimate by the Kalman filter 702. The example 700 of FIG. 7 illustrates a process for multiple time steps t−1, t, and t+1. Multiple Kalman filters 702 and neural augmentation units 704 are shown for illustrative purposes to show a timeline over multiple time-steps. Aspects of the present disclosure may use a single Kalman filter 702 and a single neural augmentation unit 704 for each time step. Alternatively, multiple Kalman filters 702 and neural augmentation units 704 may be specified for a receiving device.

As shown in FIG. 7, the process described with respect to a current time step t may be repeated for subsequent time steps, such as a next time step t+1. In one configuration, when a pilot symbol is not received (e.g., an observation is missing), the neural augmentation unit 704 may use a synthetic observation $\tilde{o}_t$ for a current time step t generated by the neural augmentation unit 704 at a previous time step t−1. For example, as shown in FIG. 7, at a current time step t, the neural augmentation unit 704 generates a synthetic observation $\tilde{o}_{t+1}$ for the next time step t+1. In some implementations, at every time step, the neural augmentation unit 704, may model residuals for the Kalman filter 702 and also model a synthetic observation 5 for a next step. In a case of a missing observation, the neural augmentation unit 704 takes the synthetic observation 5 for current time step modeled by itself during the last time step as an input. Alternatively, in a case when real pilots are observed, the neural augmentation unit 704 may use the real observation o as an input. In the example 700 of FIG. 7, optional steps are illustrated with dashed lines. The synthetic observation $\tilde{o}_{t+1}$ may be used by one or both of the Kalman filter 702 or the neural augmentation unit 704. In some implementations, the neural augmentation unit 704 may be trained to generate the synthetic observation $\tilde{o}_{t+1}$ based on a ground-truth of the channel state $h_t$ or a ground-truth of an actual observation $o_t$.

In some implementations, the neural augmentation unit 704 may maintain one or multiple internal states (e.g., as performed in an LSTM network). In some examples, additional information, such as independent channel taps, may impose additional restrictions on parameters learned by the neural augmentation unit 704.

In some implementations, the Kalman filter 702 and the neural augmentation unit 704 may be simultaneously trained. That is, the Kalman filter 702 and the neural augmentation unit 704 may be considered as one system (e.g., function) and the parameters of the Kalman filter 702 and the neural augmentation unit 704 may be trained together. The parameters include Kalman parameters as well as the neural network parameters.

In another implementation, the Kalman filter 702 may be trained individually. After training the Kalman filter, a combination of the Kalman filter 702 and the neural augmentation unit 704 (e.g., the NA-KF) may be trained as a whole. In this implementation, the parameters of the Kalman filter 702 may be fixed when the combination of the Kalman filter 702 and the neural augmentation unit 704 are trained as a whole. The training data may train the neural network parameters when the combination of the Kalman filter 702 and the neural augmentation unit 704 are trained after separately training the Kalman filter 702. In one configuration, the neural network parameters may be trained based on a loss between a channel estimate and an actual ground truth channel. In such an example, the channel estimate may be the sum of the estimate of the Kalman filter 702 and a residual output from the neural augmentation unit 704. The residual error may then be used as the ground truth for the neural augmentation unit 704. Alternatively, as described, when training the combination of the Kalman filter 702 and the neural augmentation unit 704 as a whole, the parameters of Kalman filter 702 may be fixed and the parameters of the neural augmentation unit 704 may be trained. That is, the training may be a two-step process, where the Kalman filter 702 is trained individually and then plugged into the combination of the Kalman filter 702 and the neural augmentation unit 704 to learn the neural network parameters (e.g., weights).

The synthetic observations $\tilde{o}_t$ may be optional during training. A fine tuning step may be performed online or offline. The fine tuning process may be applied based on the described training processes.

Figure 8:
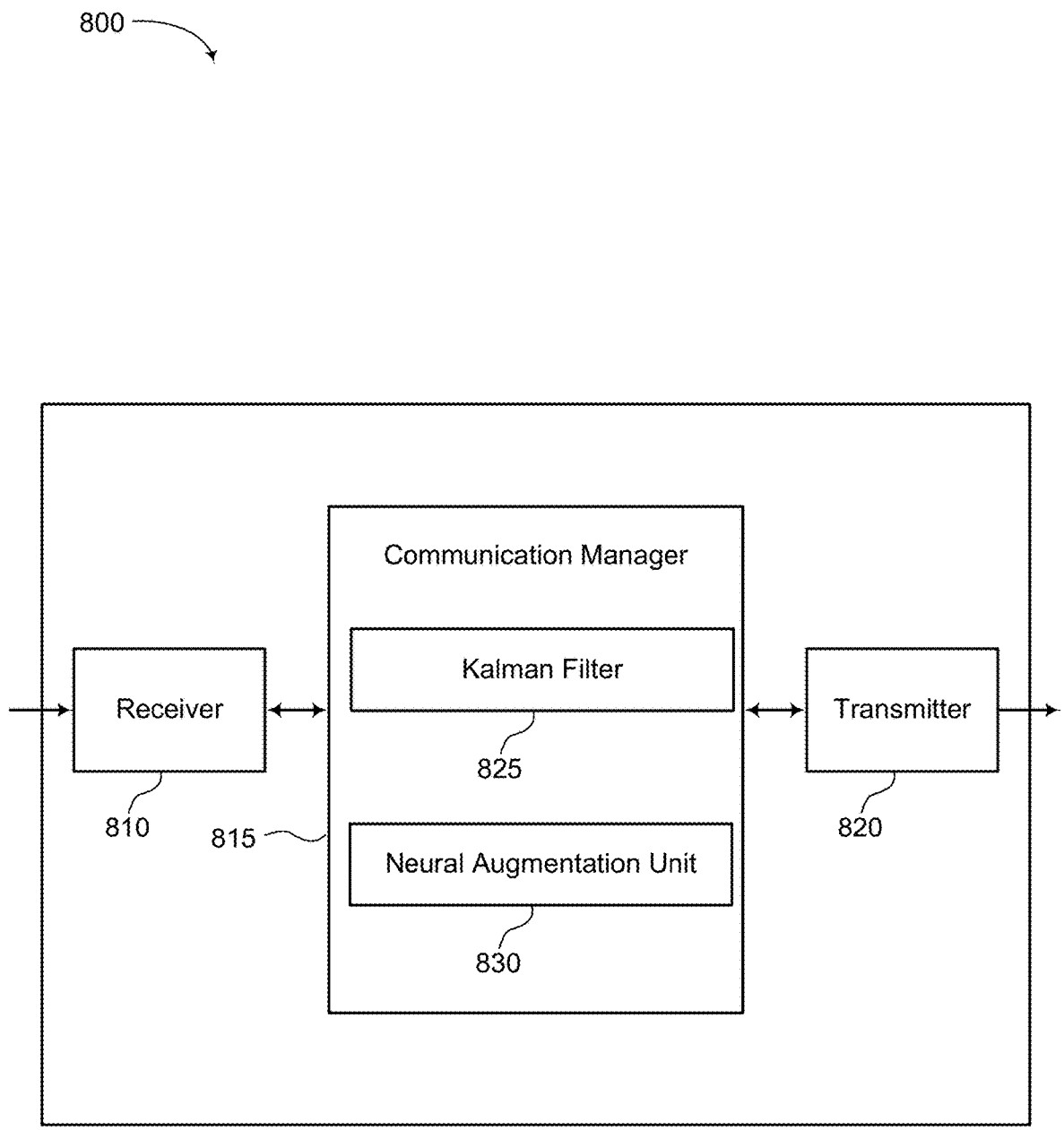
FIG. 8 is a block diagram illustrating an example a wireless communication device configured to estimating a channel and tracking the channel with a neurally-augmented Kalman filter, in accordance with aspects of the present disclosure.

FIG. 8 is a block diagram illustrating an example a wireless communication device 800 configured to estimating a channel and tracking the channel with a neurally-augmented Kalman filter, in accordance with aspects of the present disclosure. The wireless communication device 800 may be an example of aspects of a base station 110, described with reference to FIGS. 1 and 2, or a UE 120, described with reference to FIGS. 1 and 2. The wireless communication device 800 may include a receiver 810, a communication manager 815, and a transmitter 820, which may be in communication with one another (for example, via one or more buses). In some implementations, the receiver 810 and the transmitter 820. In some examples, the wireless communication device 800 is configured to perform operations, including operations of the process 900 described below with reference to FIG. 9.

In some examples, the wireless communication device 800 can include a chip, system on chip (SoC), chipset, package, or device that includes at least one processor and at least one modem (for example, a 5G modem or other cellular modem). In some examples, the communication manager 815, or its sub-components, may be separate and distinct components. In some examples, at least some components of the communication manager 815 are implemented at least in part as software stored in a memory. For example, portions of one or more of the components of the communication manager 815 can be implemented as non-transitory code executable by the processor to perform the functions or operations of the respective component.

The receiver 810 may receive one or more reference signals (for example, periodically configured CSI-RSs, aperiodically configured CSI-RSs, or multi-beam-specific reference signals), synchronization signals (for example, synchronization signal blocks (SSBs)), control information, and/or data information, such as in the form of packets, from one or more other wireless communication devices via various channels including control channels (for example, a physical downlink control channel (PDCCH)) and data channels (for example, a physical downlink shared channel (PDSCH)). The other wireless communication devices may include, but are not limited to, another base station 110 or another UE 120, described with reference to FIGS. 1 and 2.

The received information may be passed on to other components of the wireless communication device 800. The receiver 810 may be an example of aspects of the receive processor 258 or 238 described with reference to FIG. 2. The receiver 810 may include a set of radio frequency (RF) chains that are coupled with or otherwise utilize a set of antennas (for example, the set of antennas may be an example of aspects of the antennas 252a through 252r or the antennas 234a through 234t described with reference to FIG. 2).

The transmitter 820 may transmit signals generated by the communication manager 815 or other components of the wireless communication device 800. In some examples, the transmitter 820 may be collocated with the receiver 810 in a transceiver. The transmitter 820 may be an example of aspects of the transmit processor 264 described with reference to FIG. 2. The transmitter 820 may be coupled with or otherwise utilize a set of antennas (for example, the set of antennas may be an example of aspects of the antennas 252a through 252r or the antennas 234a through 234t described with reference to FIG. 2), which may be antenna elements shared with the receiver 810. In some examples, the transmitter 820 is configured to transmit control information in a physical uplink control channel (PUCCH) and data in a physical uplink shared channel (PUSCH).

The communication manager 815 may be an example of aspects of the controller/processor 240 or 280 described with reference to FIG. 2. The communication manager 815 includes a Kalman filter 825 and a neural augmentation unit 830. In some examples, working in conjunction with the receiver 810, the Kalman filter 825 may generate an initial channel estimate of a channel for a current time step based on a first signal received at the communication device. In some examples, the channel may be a wireless communication channel. Additionally, working in conjunction with the Kalman filter 825 and the receiver 810, the neural augmentation unit 830 infers a residual of the initial channel estimate of the current time step. The neural augmentation unit 830 may be a recurrent neural network, such as the neural augmentation unit 704 described with reference to FIG. 7. Working in conjunction with the Kalman filter 825 and the neural augmentation unit 830, the communication manager 815 may update the initial channel estimate of the current time step based on the residual.

Figure 9:
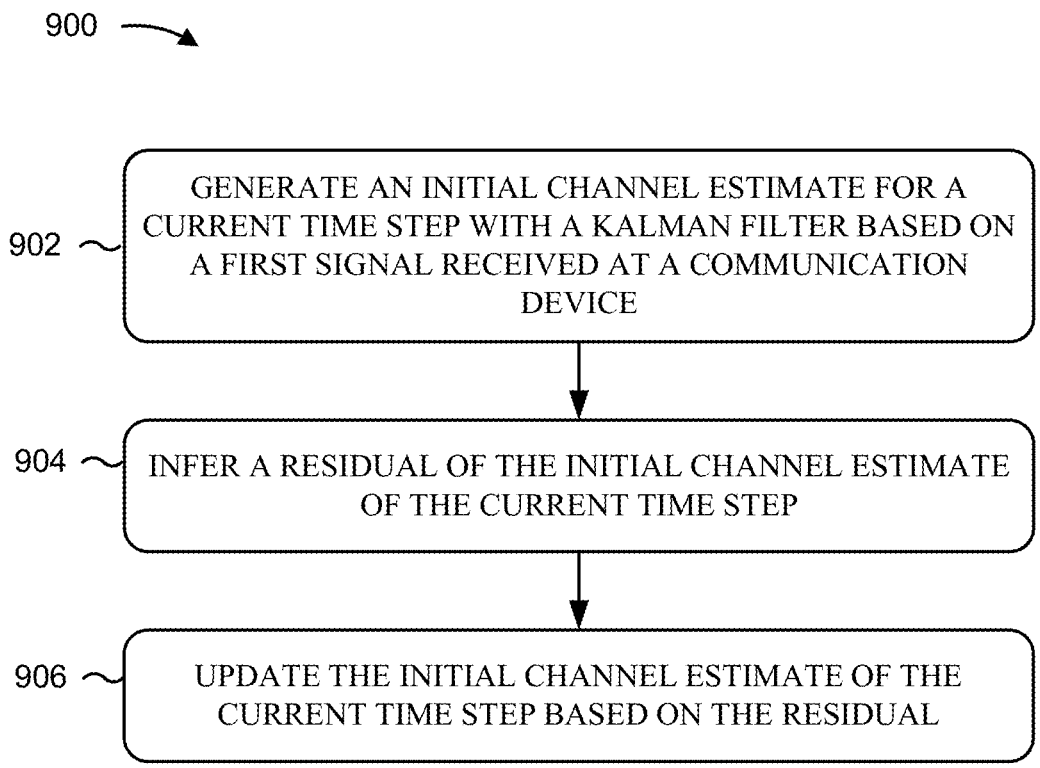
FIG. 9 is a diagram illustrating an example process performed, for example, by a receiving device, in accordance with various aspects of the present disclosure.

FIG. 9 is a flowchart illustrating an example process 900 for wireless communication that supports estimating a channel and tracking the channel with a neurally-augmented Kalman filter, in accordance with aspects of the present disclosure. In some implementations, the process 900 may be performed by a wireless communication device operating as or within a UE, such as one of the UEs 120 described above with respect to FIGS. 1 and 2, or a base station, such as one of the base stations 110 described above with respect to FIGS. 1 and 2.

As shown in FIG. 9, the process 900 begins at block 902 by generating an initial channel estimate of a channel for a current time step with a Kalman filter based on a first signal received at the communication device. In some examples, the channel may be a wireless communication channel. At block 904, the process 900 infers, with a neural network, a residual of the initial channel estimate of the current time step. The neural network may be a recurrent neural network, such as the neural augmentation unit 704 described with reference to FIG. 7. In some examples, the initial channel estimate of the current time step may include a mean and a covariance. In such examples, the residual may include a residual mean based on the mean of the initial channel estimate and a residual covariance based on the covariance of the initial channel estimate. At block 906, the process updates the initial channel estimate of the current time step based on the residual. In some examples, the process 900 may generate an actual channel estimate based on updating the initial channel estimate, and also decode a second signal received on the channel based on the actual channel estimate. Additionally, the initial channel estimate for the current time step may be based on an actual channel estimate from a previous time step Implementation examples are described in the following numbered clauses:

1. A method performed by a communication device, comprising:
   generating an initial channel estimate of a channel for a current time step with a Kalman filter based on a first signal received at the communication device;
   inferring, with a neural network, a residual of the initial channel estimate of the current time step; and
   updating the initial channel estimate of the current time step based on the residual.

2. The method of Clause 1, in which:
   the initial channel estimate of the current time step comprises a mean and a covariance; and
   the residual comprises a residual mean based on the mean of the initial channel estimate and a residual covariance based on the covariance of the initial channel estimate.

3. The method of any one of Clauses 1-2, further comprising generating the initial channel estimate of the current time step and inferring the residual based on a channel observation of the current time step.

4. The method of Clause 3, further comprising generating the channel observation from a pilot symbol or a data symbol, in which a waveform of the pilot symbol or the data symbol is known from decoding a previous pilot symbol or a previous data symbol.

5. The method of Clause 3, further comprising generating the channel observation based on a synthetic pilot estimate in an absence of a received pilot symbol.

6. The method of any one of Clauses 1-5, further comprising:
generating an actual channel estimate based on updating the initial channel estimate; and
decoding a second signal received on the channel based on the actual channel estimate.

7. The method of any one of Clauses 1-6, further comprising generating the initial channel estimate for the current time step based on an actual channel estimate from a previous time step.

8. The method of any one of Clauses 1-7, in which the neural network is a recurrent neural network.

9. An apparatus at a communication device, comprising:
a processor;
a memory coupled with the processor; and
instructions stored in the memory and operable, when executed by the processor, to cause the apparatus:
to generate an initial channel estimate of a channel for a current time step with a Kalman filter based on a first signal received at the communication device;
to infer, with a neural network, a residual of the initial channel estimate of the current time step; and
to update the initial channel estimate of the current time step based on the residual.

10. The apparatus of Clause 9, in which:
the initial channel estimate of the current time step comprises a mean and a covariance; and
the residual comprises a residual mean based on the mean of the initial channel estimate and a residual covariance based on the covariance of the initial channel estimate.

11. The apparatus of Clause 9 or 10, in which execution of the instructions further cause the apparatus to generate the initial channel estimate of the current time step and inferring the residual based on a channel observation of the current time step.

12. The apparatus of Clause 11, in which execution of the instructions further cause the apparatus to generate the channel observation from a pilot symbol or a data symbol, in which a waveform of the pilot symbol or the data symbol is known from decoding of a previous pilot symbol or a previous data symbol.

13. The apparatus of Clause 11, in which execution of the instructions further cause the apparatus to generate the channel observation based on a synthetic pilot estimate in an absence of a received pilot symbol.

14. The apparatus of any of Clauses 9-13, in which execution of the instructions further cause the apparatus:
to generate an actual channel estimate based on updating the initial channel estimate; and
to decode a second signal received on the channel based on the actual channel estimate.

15. The apparatus of any of Clauses 9-14, in which execution of the instructions further cause the apparatus to generate the initial channel estimate for the current time step based on an actual channel estimate from a previous time step.

16. The apparatus of any of Clauses 9-15, in which the neural network is a recurrent neural network.

17. A non-transitory computer-readable medium having program code recorded thereon at a communication device, the program code executed by a processor and comprising:
program code to generate an initial channel estimate of a channel for a current time step with a Kalman filter based on a first signal received at the communication device;
program code to infer, with a neural network, a residual of the initial channel estimate of the current time step; and
program code to update the initial channel estimate of the current time step based on the residual.

18. The non-transitory computer-readable medium of Clause 17, in which:
the initial channel estimate of the current time step comprises a mean and a covariance; and
the residual comprises a residual mean based on the mean of the initial channel estimate and a residual covariance based on the covariance of the initial channel estimate.

19. The non-transitory computer-readable medium of Clause 17 or 18, in which the program code further comprises program code to generate the initial channel estimate of the current time step and inferring the residual based on a channel observation of the current time step.

20. The non-transitory computer-readable medium of Clause 19, in which the program code further comprises program code to generate the channel observation from a pilot symbol or a data symbol, in which a waveform of the pilot symbol or the data symbol is known from decoding of a previous pilot symbol or a previous data symbol.

21. The non-transitory computer-readable medium of Clause 19, in which the program code further comprises program code to generate the channel observation based on a synthetic pilot estimate in an absence of a received pilot symbol.

22. The non-transitory computer-readable medium of any of Clauses 17-21, in which the program code further comprises:
program code to generate an actual channel estimate based on updating the initial channel estimate; and
program code to decode a second signal received on the channel based on the actual channel estimate.

23. The non-transitory computer-readable medium of any of Clauses 17-22, in which the program code further comprises program code to generate the initial channel estimate for the current time step based on an actual channel estimate from a previous time step.

24. The non-transitory computer-readable medium of any of Clauses 17-23, in which the neural network is a recurrent neural network.

25. An apparatus at a communication device, comprising:
means for generating an initial channel estimate of a channel for a current time step with a Kalman filter based on a first signal received at a communication device;
means for inferring, with a neural network, a residual of the initial channel estimate of the current time step; and
means for updating the initial channel estimate of the current time step based on the residual.

26. The apparatus of Clause 25, in which:
the initial channel estimate of the current time step comprises a mean and a covariance; and the residual comprises a residual mean based on the mean of the initial channel estimate and a residual covariance based on the covariance of the initial channel estimate.

27. The apparatus of Clause 25 or 26, further comprising means for generating the initial channel estimate of the current time step and inferring the residual based on a channel observation of the current time step.

28. The apparatus of Clause 27, further comprising means for generating the channel observation from a pilot symbol or a data symbol, in which a waveform of the pilot symbol or the data symbol is known from decoding of a previous pilot symbol or a previous data symbol.

29. The apparatus of Clause 27, further comprising means for generating the channel observation based on a synthetic pilot estimate in an absence of a received pilot symbol.

30. The apparatus of any of Clauses 25-29, further comprising:
means for generating an actual channel estimate based on updating the initial channel estimate; and
means for decoding a second signal received on the channel based on the actual channel estimate.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method performed by a communication device, comprising:
generating an initial channel estimate of a channel for a current time step with a Kalman filter based on a first signal received at the communication device;
inferring, with a neural network, a residual of the initial channel estimate of the current time step; and
updating the initial channel estimate of the current time step based on the residual.

2. The method of claim 1, in which:
the initial channel estimate of the current time step comprises a mean and a covariance; and
the residual comprises a residual mean based on the mean of the initial channel estimate and a residual covariance based on the covariance of the initial channel estimate.

3. The method of claim 1, further comprising generating the initial channel estimate of the current time step and inferring the residual based on a channel observation of the current time step.

4. The method of claim 3, further comprising generating the channel observation from a pilot symbol or a data symbol, in which a waveform of the pilot symbol or the data symbol is known from decoding of a previous pilot symbol or a previous data symbol.

5. The method of claim 3, further comprising generating the channel observation based on a synthetic pilot estimate in an absence of a received pilot symbol.

6. The method of claim 1, further comprising:
generating an actual channel estimate based on updating the initial channel estimate; and
decoding a second signal received on the channel based on the actual channel estimate.

7. The method of claim 1, further comprising generating the initial channel estimate for the current time step based on an actual channel estimate from a previous time step.

8. The method of claim 1, in which the neural network is a recurrent neural network.

9. An apparatus at a communication device, comprising:
a processor;
a memory coupled with the processor; and
instructions stored in the memory and operable, when executed by the processor, to cause the apparatus:
to generate an initial channel estimate of a channel for a current time step with a Kalman filter based on a first signal received at the communication device;
to infer, with a neural network, a residual of the initial channel estimate of the current time step; and
to update the initial channel estimate of the current time step based on the residual.

10. The apparatus of claim 9, in which:
the initial channel estimate of the current time step comprises a mean and a covariance; and the residual comprises a residual mean based on the mean of the initial channel estimate and a residual covariance based on the covariance of the initial channel estimate.

11. The apparatus of claim 9, in which execution of the instructions further cause the apparatus to generate the initial channel estimate of the current time step and inferring the residual based on a channel observation of the current time step.

12. The apparatus of claim 11, in which execution of the instructions further cause the apparatus to generate the channel observation from a pilot symbol or a data symbol, in which a waveform of the pilot symbol or the data symbol is known from decoding of a previous pilot symbol or a previous data symbol.

13. The apparatus of claim 11, in which execution of the instructions further cause the apparatus to generate the channel observation based on a synthetic pilot estimate in an absence of a received pilot symbol.

14. The apparatus of claim 9, in which execution of the instructions further cause the apparatus:
to generate an actual channel estimate based on updating the initial channel estimate; and
to decode a second signal received on the channel based on the actual channel estimate.

15. The apparatus of claim 9, in which execution of the instructions further cause the apparatus to generate the initial channel estimate for the current time step based on an actual channel estimate from a previous time step.

16. The apparatus of claim 9, in which the neural network is a recurrent neural network.

17. A non-transitory computer-readable medium having program code recorded thereon at a communication device, the program code executed by a processor and comprising:
program code to generate an initial channel estimate of a channel for a current time step with a Kalman filter based on a first signal received at the communication device;
program code to infer, with a neural network, a residual of the initial channel estimate of the current time step; and
program code to update the initial channel estimate of the current time step based on the residual.

18. The non-transitory computer-readable medium of claim 17, in which:
the initial channel estimate of the current time step comprises a mean and a covariance; and
the residual comprises a residual mean based on the mean of the initial channel estimate and a residual covariance based on the covariance of the initial channel estimate.

19. The non-transitory computer-readable medium of claim 17, in which the program code further comprises program code to generate the initial channel estimate of the current time step and inferring the residual based on a channel observation of the current time step.

20. The non-transitory computer-readable medium of claim 19, in which the program code further comprises program code to generate the channel observation from a pilot symbol or a data symbol, in which a waveform of the pilot symbol or the data symbol is known from decoding of a previous pilot symbol or a previous data symbol.

21. The non-transitory computer-readable medium of claim 19, in which the program code further comprises program code to generate the channel observation based on a synthetic pilot estimate in an absence of a received pilot symbol.

22. The non-transitory computer-readable medium of claim 17, in which the program code further comprises:
program code to generate an actual channel estimate based on updating the initial channel estimate; and
program code to decode a second signal received on the channel based on the actual channel estimate.

23. The non-transitory computer-readable medium of claim 17, in which the program code further comprises program code to generate the initial channel estimate for the current time step based on an actual channel estimate from a previous time step.

24. The non-transitory computer-readable medium of claim 17, in which the neural network is a recurrent neural network.

25. An apparatus at a communication device, comprising:
means for generating an initial channel estimate of a channel for a current time step with a Kalman filter based on a first signal received at the communication device;
means for inferring, with a neural network, a residual of the initial channel estimate of the current time step; and
means for updating the initial channel estimate of the current time step based on the residual.

26. The apparatus of claim 25, in which:
the initial channel estimate of the current time step comprises a mean and a covariance; and
the residual comprises a residual mean based on the mean of the initial channel estimate and a residual covariance based on the covariance of the initial channel estimate.

27. The apparatus of claim 25, further comprising means for generating the initial channel estimate of the current time step and inferring the residual based on a channel observation of the current time step.

28. The apparatus of claim 27, further comprising means for generating the channel observation from a pilot symbol or a data symbol, in which a waveform of the pilot symbol or the data symbol is known from decoding of a previous pilot symbol or a previous data symbol.

29. The apparatus of claim 27, further comprising means for generating the channel observation based on a synthetic pilot estimate in an absence of a received pilot symbol.

30. The apparatus of claim 25, further comprising:
means for generating an actual channel estimate based on updating the initial channel estimate; and
means for decoding a second signal received on the channel based on the actual channel estimate.

* * * * *